United States Patent [19]
Fukunaga

[11] 4,360,241

[45] Nov. 23, 1982

[54] INSTRUMENT PANEL

[75] Inventor: Yukio Fukunaga, Yokohama, Japan

[73] Assignee: Nissan Motor Company, Limited, Yokohama, Japan

[21] Appl. No.: 154,276

[22] Filed: May 29, 1980

[30] Foreign Application Priority Data

Apr. 6, 1979 [JP] Japan ................................ 54-68840

[51] Int. Cl.[3] ........................................... H01R 33/00

[52] U.S. Cl. ........................................ 339/10; 339/4; 339/119 R; 296/70

[58] Field of Search ................ 296/70; 339/4, 10, 78, 339/79, 64 R, 64 M, 75 R, 75 M, 119 R

[56] References Cited

U.S. PATENT DOCUMENTS

| | | | |
|---|---|---|---|
| 2,765,863 | 10/1956 | Barenyi | 296/70 X |
| 2,810,114 | 10/1957 | Shaw | 339/4 X |
| 3,425,025 | 1/1969 | Williams | 339/75 M |
| 3,649,953 | 3/1972 | Hoffman | 339/64 M |

FOREIGN PATENT DOCUMENTS

| | | |
|---|---|---|
| 658881 | 10/1951 | United Kingdom . |
| 1097158 | 12/1967 | United Kingdom . |
| 1187748 | 4/1970 | United Kingdom . |

*Primary Examiner*—Eugene F. Desmond
*Attorney, Agent, or Firm*—Lane, Aitken, Kice & Kananen

[57] ABSTRACT

A structure for arranging a harness within an instrument panel for an automotive vehicle having a vehicle body, the harness being composed of a first lead wiring and a second lead wiring, the former being provided to the vehicle body, the latter being provided to the instrument panel, comprises a plate for covering a large opening formed between the vehicle body and the lower edge of the instrument panel, a bracket extending along the lower edge of the instrument panel between and fixed at its ends to both sides of the vehicle body for fixedly supporting the instrument panel at its lower portion, a first connector attached to an end of the first lead wiring, a second connector attached to an end of the second lead wiring, the second connector being to be connected with the first connector, the lower portion of the instrument panel having a small opening near the bracket, the first connector being fixed relative to the bracket in such a way that the connecting point of the first and second connectors is positioned near the small opening in the lower portion of the instrument panel, and a lid adapted to cover the small opening in the lower portion for the instrument panel.

9 Claims, 8 Drawing Figures

9 4 10 7 6 1 8 13' 14 13' 12 13a'

INSTRUMENT PANEL

BACKGROUND OF THE INVENTION

The present invention relates to an improved instrument panel, and in particular relates to a structure for arranging a harness within an instrument panel for an automotive vehicle.

FIG. 1 illustrates a conventional instrument panel 1 which is equipped with an instrument 3, a switch 4 and other parts. A bracket 6 is placed along the lower edge of the instrument panel 1 in its longitudinal direction and fixed at both its ends to the side walls of the vehicle body 2 so as to attach the instrument panel 1 thereto by screw means. A harness is composed of a first lead wiring 11 and a second lead wiring 7 which are provided at their ends with a first connector 10 and a second connector 8, respectively. The first lead wiring 11 is fixed to a vertical panel 2*a* of the vehicle body 2 and the second lead wiring 7 is fixed through a harness clip 9 to the bracket 6. A plate 12 covers an opening between the lower edge of the instrument panel 1 and the vertical panel 2*a* of the vehicle body 2 for the purpose of soundproofing.

In such a conventional instrument panel 1, the first and second lead wirings 11, 7 of the harness are connected either of the following two manners:

(1) The instrument panel 1 is fixed at its upper, lower and both side portions to the vehicle body 2 and the bracket 6 by screw means. Thereafer, a hand is inserted into the space defined by the vehicle body 2 and the instrument panel 1 through the opening between the lower edge of the instrument panel 1 and the vertical panel 2*a* of the vehicle body 2 so that the second connector 8 is manually connected to the first connector 10. Finally, the plate 12 is attached to the instrument panel 1 and the vehicle body 2 to close the opening.

(2) First of all, the first connector 10 is connected to the second connector 8 by a hand or hands inserted into a clearance between the instrument panel 1 and the vehicle body 2 when the instrument panel 1 is held near its attaching position to the vehicle body 2. Thereafter, the instrument panel 1 is fixed to the vehicle body 2 and the bracket 6 by screw means or the like. Finally the plate 12 is attached to the instrument panel 1 and the vehicle 2.

In such conventional manners, the connecting point of the connectors 8 and 10 is positioned behind the instrument panel 1 so that the worker can not easily connect them. Thus connecting thereof is apt to be imperfect. Since the plate 12 must be removed, it takes a long time if maintenance or service is desired.

SUMMARY OF THE INVENTION

It is an object of the present invention to provide an improved instrument panel in which a harness can be easily connected with ensurance.

It is a further object of the present invention to provide an instrument panel which can facilitate a maintenance and service of a harness within the instrument panel.

According to the present invention, an instrument panel for an automotive vehicle has at its lower porton a small opening near a bracket fixedly supporting the instrument panel. A pair of connectors for a harness are connected near the small opening. A lid covers the small opening.

BRIEF DESCRIPTION OF THE DRAWINGS

The present invention will become more apparent from the following description of the preferred embodiments thereof when taken in conjunction with the accompanying drawings in which.

DETAILED DESCRIPTION OF THE PREFERRED EMBODIMENTS

Figure 1:
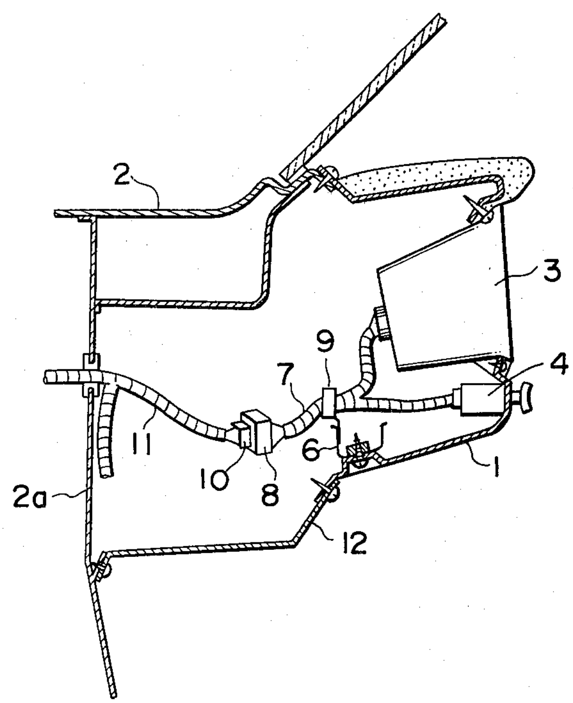
FIG. 1 illustrates a conventional structure for arranging a harness within an instrument panel for an automotive vehicle.
Figure 2:
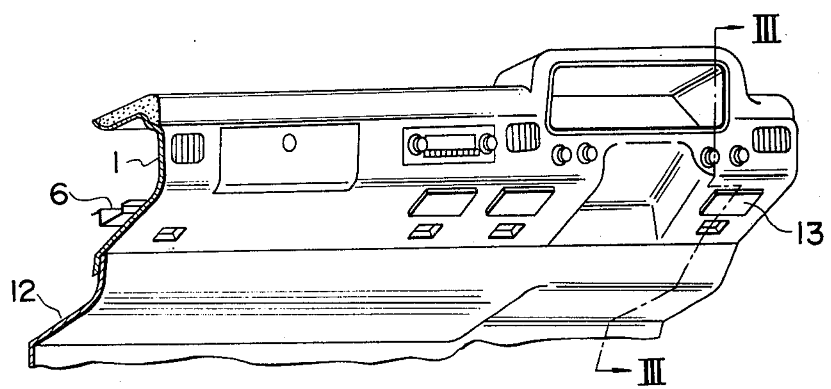
FIG. 2 is a perspective view illustrating an instrument panel for an automotive vehicle incorporating an embodiment of the present invention, with some parts being omitted for clarity.
Figure 3:
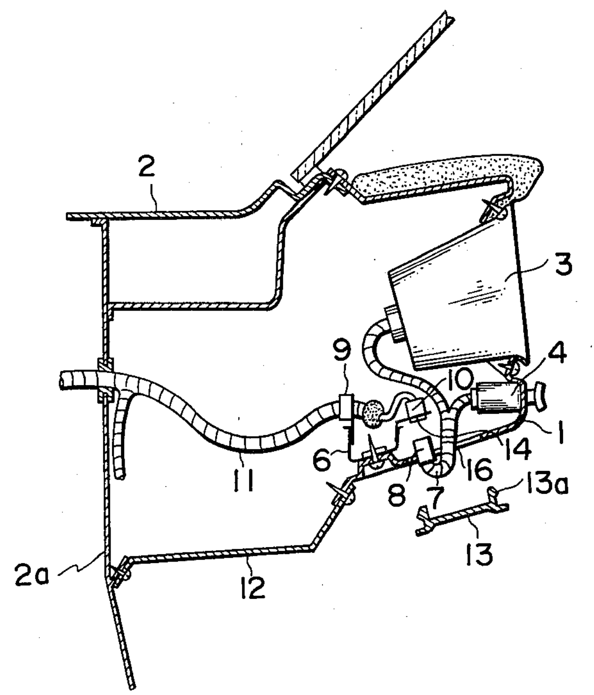
FIG. 3 is a sectional view taken along the line III—III in FIG. 2.

Referring now to FIGS. 2 and 3, a preferred embodiment of the present invention is illustrated. An instrument panel 1 is equipped with an instrument 3, a switch 4 and other parts at the front portion thereof. A bracket 6 is fixed at its ends to the vehicle body 2 for fixedly supporting the instrument panel 1 in a conventional manner. A first lead wiring 11 and a second lead wiring 7 constitute a part of a wire harness. A first connector 10 is fixed to an end of the first lead wiring 11 while a second connector 8 is fixed to an end of the second lead wiring 7. The first lead wiring 11 penetrates at its intermediate portion through a vertical panel 2*a* of the vehicle body 2. The branched ends of the second lead wiring 7 are connected to the instrument 3, switch 4 and other parts. A plate 12 is attached to the vertical panel 2*a* of the vehicle body 2 and the lower edge of the instrument panel 1 so as to close the opening defined thereby.

A connector holder 14 and a harness clip 9 are fixed to the bracket 6 by screw or welding means. The harness clip 9 fixedly holds the first lead wiring 11 near its end portion. The first connector 10 is fixedly held by the connector holder 14 in such a way that the connecting portion of the connector 10 faces downwardly toward an opening 16 formed in a lower portion of the instrument panel 1. The opening 16 is such that the first and second connectors 10, 8 can be connected and disconnected at the opening 16 if desired. The opening 16 is positioned near the connector holder 14 so as to face the connecting portion of the second connector 10. A lid 13 is attached to the instrument panel 1, thereby to close the opening 16. It is preferable that the lid 13 is provided with a locking mechanism such as a locking leg 13*a* to be resiliently fitted with the opening 16.

How to assemble the instrument panel 1 and its related members will be described.

The bracket 6 is attached at its both ends to the side walls of the vehicle body 2 so as to be arranged horizontally in the vehicle body 2. The first lead wiring 11 is fixed through the harness clip 9 to the bracket 6 near the end portion of the first lead wiring 11. The connector 10 at an end of the first lead wiring 11 is attached to the connector holder 14. On the other hand, the lid 13 is detached from the instrument panel 1 to open the opening 16, the instrument panel 1 being equipped with the instrument 3, switch 4 and other parts. While the second lead wiring 7 and the second connector 8 hang through the opening 16, the instrument panel 1 is attached to the bracket 6 and the vehicle body 2 by screw means or the like. Thereafter, a hand is inserted through the opening 16 into the inner space of the instrument panel 1 to connect the second connector 8 with the first connector 10. The lid 13 with the locking mechanism is resiliently fitted into the opening 13, thereby to close it. Finally, the plate 12 is fixed to the instrument panel 1 and the vehicle body 2 by the screws.

If maintenance or service of the harness in the instrument panel 1 is required, then the lid 13 is removed from the instrument panel 1 to open the opening 16 so that a hand can be inserted through the opening 16 to pull the second connector 8, thereby to disconnect it from the first connector 10.

Figure 4:
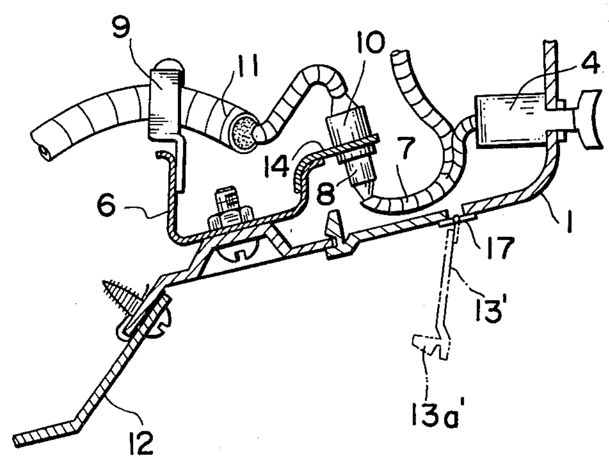
FIG. 4 is an enlarged view showing a further embodiment of the present invention.

FIG. 4 illustrates a further embodiment of the present invention. A lid 13' is hinged at a point 17 with the instrument panel 1 so as to rotate around the point 17. The front edge of the lid 13' is provided with a locking mechanism such as a locking leg **13*a'* made of a resilient material. Except for the lid 13' and its related construction, the embodiment in FIG. 4 is substantially the same as the embodiment shown in FIGS. 2 and 3**.

Figure 5:
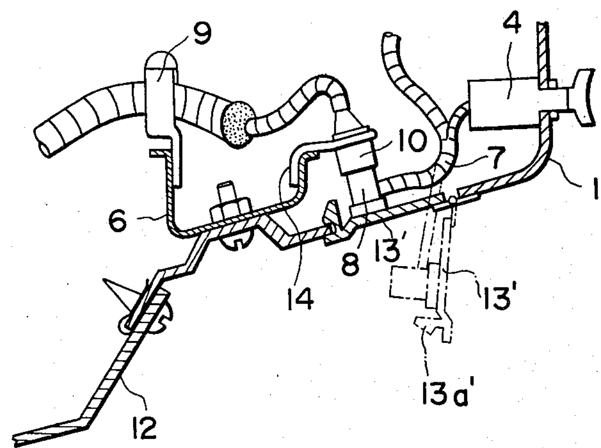
FIG. 5 is an enlarged view showing still a further embodiment of the present invention.

FIG. 5 illustrates still a further embodiment of the present invention. The second connector 8 is attached on the inner side of the rotatable lid 13' shown in FIG. 4 at such a position that it engages with the first connector 10 when the lid 13' is closed, as shown by the solid line in FIG. 5. For example, the second connector 8 can be fixed to the lid 13' by a screw, adhesive, or locking means.

Figure 6:
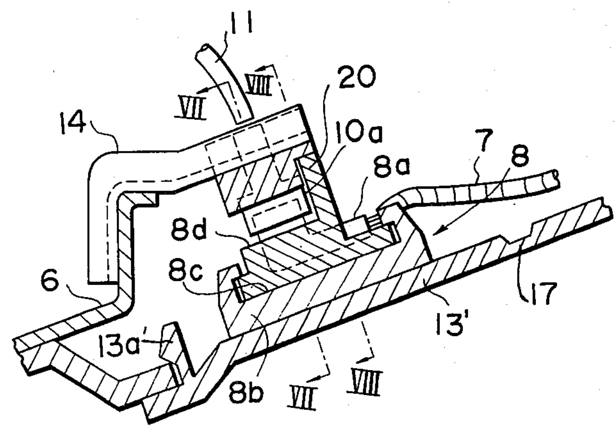
FIG. 6 is an enlarged view showing another embodiment of the present invention.
Figure 7:
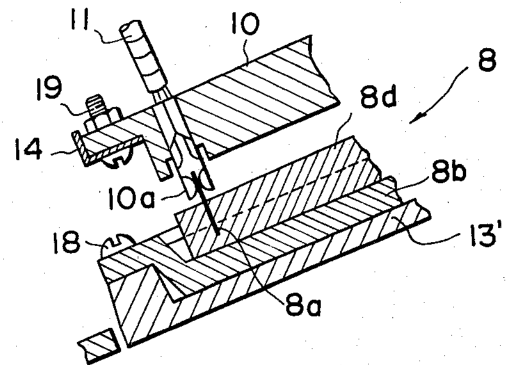
FIG. 7 is a sectional view taken along the line VII—VII in FIG. 6.
Figure 8:
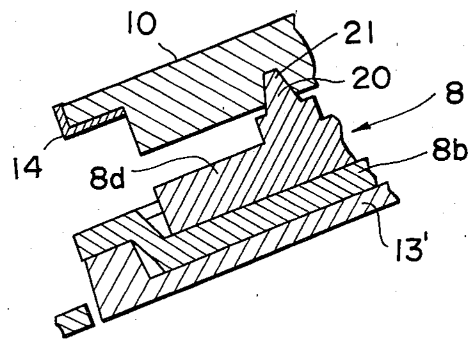
FIG. 8 is a sectional view taken along the line VIII—VIII in FIG. 6.

FIGS. 6 through 8 illustrate yet another embodiment of the present invention in which an alignment mechanism for the first and second connectors 10, 8 is employed. The second connector 8 has a terminal **8*a* like a flat plate which is a male terminal. The first connector 10 has a female terminal 10*a* which is so formed as to receive the male terminal 8*a*. The female terminal 10*a* is composed of a pair of plates each having at their inner and lower sides a projection, as best shown in FIG. 7, for elastically pressing against the male terminal 8*a* from the opposite directions so as to obtain a good electrical contact therebetween. The second connector 8 includes a housing 8*b* with a recess 8*c* formed in the inner side thereof. The outer side of the housing 8*b* is fixed to the inner side of the lid 13'. A slider 8*d* of the second connector 8 is slidable within a limited range in the recess 8*c* formed in the inner side of the housing 8*b* in the direction parallel with the axis of the hinge 17. The male terminal 8*a* in a flat-plate shape is placed in a direction perpendicular to the sliding direction of the slider 8*d* of the second connector 8. In addition, as best shown in FIG. 8, the second connector 8 has a tapered projection 20 on the slider 8*d* while the first connector 10 has a recessed portion 21 corresponding to the projection 20 of the second connector 8. When the projection 20 of the second connector 8 is fitted into the recessed portion 21 of the first connector 10, the male terminal 8*a* is aligned with the female terminal 10*a* in the sliding direction of the slider 8*d***.

In operation, the male terminal **8*a* can be inserted between the two plates of the female terminal 10*a* against their spring force in the rotation direction of the lid 13' with certainty because they extend widely in the same direction. Also, the female terminal 10*a* can be so designed as to contact a wide area of the male terminal 8*a* because they are formed like a flat plate. In addition, since the slider 8*d* of the second connector 8 is slidable in the direction perpendicular to the rotation direction of the lid 13', the male and female terminals can be automatically aligned when the projection 20 of the second connector 8 is fitted into the recessed portion 21 of the first connector 10. The engagement of the projection 20 with the corresponding recessed portion 21 permits the male terminal 8*a* to be aligned with the female terminal 10 because the slider 8*d* is slid and adjusted within the recess 8*c* of the housing 8*b* in the direction perpendicular to the rotation direction of the lid 13' if the male terminal 8*a* is not aligned with the female terminal 10*a*. When the recess 21 is completely engaged with the projection 20, the first and second connectors 10, 8 are connected with assurance. At that time, the locking leg 13*a'* is fitted into the opening 16 so that the lid 13' is locked to the instrument panel 1**.

In order to disconnect the first connector 10 from the second connector 8, it is necessary only to rotate the lid 13' against the locking force of the locking leg **13*a'***.

Although the alignment mechanism is provided on the second connector 8 in the above-described embodiment, it can be provided on the first connector 10 in place thereof.

As can be seen from the foregoing, according to the present invention, a worker can easily see an area where a first connector is connected with a second connector, from the passenger compartment so that the workability can be remarkably improved. Also, the incomplete connection thereof can be easily avoided. In addition, it is not required to remove the plate for soundproofing purposes when maintenance or service of the connectors is necessary. Thus, the connection and disconnection of the first and second connectors can be quickly finished.

The present invention is not restricted to the embodiments already shown and described. For example, the lid, hinge means and instrument panel can be formed, as a unit, made of a synthetic resin such as polypropylene, as shown in FIG. 6. It can be appreciated that other modifications and additions other than those disclosed can be made without departing from the spirit and scope of the appended claims. For example, the embodiment of claim 6 can employ a separate hinge like the hinge 17 of the embodiments of FIGS. 4 and 5, and the embodiments of FIGS. 4 and 5 can employ an integral hinge.

What is claimed is:

1. A structure including, in combination:

an instrument panel for an automotive vehicle having a vehicle body, a harness being composed of a first lead wiring and a second lead wiring, the former being provided to the vehicle body, the latter being provided to the instrument panel, a plate for covering a large opening formed between said vehicle body and the lower edge of said instrument panel;

a bracket extending laterally along the lower edge of said instrument panel between both sides of the vehicle body and being fixedly supported by said vehicle body for fixedly supporting said instrument panel at its lower portion;

a first connector attached to an end of said first lead wiring;

a second connector attached to an end of said second lead wiring, said second connector being connectable with said first connector;

the lower portion of said instrument panel facing downward and having a small opening near said bracket;

said first connector being fixed relative to the bracket in such a way that the connecting point of said first and second connectors is positioned near said small opening in said lower portion of said instrument panel; and a lid for covering said small opening in said lower portion of said instrument panel said second connector being fixed to the backside of the lid and placed in such a position that, when said lid is closed, said second connector can be automatically connected with said first connector.

2. The structure of claim 1, wherein said first connector is fixedly held by a holder provided to the bracket, and the connecting portion of said first connector faces said small opening in such a way that said second connector can be easily connected with said connecting portion of said first connector.

3. The structure of claim 1, wherein said lid is hinged to said instrument panel so that said lid can be rotated to close or open said small opening.

4. The structure of claim 3, further comprising an alignment mechanism for connecting accurately said first connector with said second connector when said lid is closed.

5. The structure of claim 3, wherein said first and second connectors are connected through a connecting mechanism having a plate-like male terminal and a plate-like female terminal for receiving said male terminal.

6. The structure of claim 5, wherein said connecting mechanism comprises further a slide mechanism for permitting said male terminal to slide in a direction perpendicular to the rotation direction of said lid so as to facilitate the alignment of said first and second connectors when said lid is closed.

7. The structure of claim 6, further comprising a projection formed on said second connector and a recess formed on said first connector in such a manner that, when said lid is closed, said projection is engaged with said recess so as to align said first connector with said second connector in the direction perpendicular to the rotation direction of said lid.

8. A structure for arranging a harness within an instrument panel for an automotive vehicle having a vehicle body, the harness being composed of a first lead wiring and a second lead wiring, the former being provided to the vehicle body, the latter being provided to the instrument panel, comprising:

a plate for covering a large opening formed between said vehicle body and the lower edge of said instrument panel;

a bracket extending along the lower edge of said instrument panel between both sides of the vehicle body and being fixedly supported by said vehicle body for fixedly supporting said instrument panel at its lower portion;

a first connector attached to an end of said first lead wiring;

a second connector attached to an end of said second lead wiring, said second connector being connectable with said first connector;

the lower portion of said instrument panel having a small opening near said bracket;

said first connector being fixed relative to the bracket in such a way that the connecting point of said first and second connectors is positioned near said small opening in said lower portion of said instrument panel; and a lid connected by a hinge to the instrument panel so that the lid can be rotated to close or open said small opening in said lower portion of said instrument panel, wherein said lid, said hinge and said instrument panel are made of a synthetic resin as a unit.

9. A structure for arranging a harness within an instrument panel for an automotive vehicle having a vehicle body, the harness being composed of a first lead wiring and a second lead wiring, the former being provided to the vehicle body, the latter being provided to the instrument panel, comprising:

a plate for covering a large opening formed between said vehicle body and the lower edge of said instrument panel;

a bracket extending along the lower edge of said instrument panel between both sides of the vehicle body and being fixedly supported by said vehicle body for fixedly supporting said instrument panel at its lower portion;

a first connector attached to an end of said first lead wiring;

a second connector attached to an end of said second lead wiring, said second connector being connectable with said first connector;

the lower portion of said instrument panel having a small opening near said bracket;

said first connector being fixed relative to the bracket in such a way that the connecting point of said first and second connectors is positioned near said small opening in said lower portion of said instrument panel;

a lid hinged to the instrument panel and adapted to cover said small opening in said lower portion of said instrument panel, said second connector being fixed to the backside of said lid so that, when said lid is closed, said second connector can be automatically connected with said first connector; and a projection formed on said second connector and a recess formed on said first connector in such a manner that, when said lid is closed, said projection is engaged with said recess so as to align said first connector with said second connector in the direction perpendicular to the rotation direction of said lid.

* * * * *